(12) United States Patent
Ikeda et al.

(10) Patent No.: US 6,524,153 B1
(45) Date of Patent: Feb. 25, 2003

(54) PROCESS FOR PRODUCING DISPLAY DEVICE

(75) Inventors: Tsutomu Ikeda, Hachiohji (JP); Masahiro Nakanishi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/570,692

(22) Filed: May 12, 2000

(30) Foreign Application Priority Data

| May 14, 1999 | (JP) | 11-134916 |
| May 14, 1999 | (JP) | 11-134917 |
| May 14, 1999 | (JP) | 11-134918 |

(51) Int. Cl.$^7$ .................................................. H05D 5/06
(52) U.S. Cl. .................................... 445/24; 427/68
(58) Field of Search ............................................. 445/24

(56) References Cited

U.S. PATENT DOCUMENTS

| 3,612,758 A | | 10/1971 | Evans et al. ............. 178/5.4 R |
| 4,077,936 A | * | 3/1978 | Tanaka et al. ................. 106/32 |
| 4,758,226 A | * | 7/1988 | Carre .......................... 222/14 |
| 4,804,601 A | * | 2/1989 | Watson et al. ................. 430/32 |
| 6,327,072 B1 | * | 12/2001 | Comiskey et al. ........... 359/296 |

FOREIGN PATENT DOCUMENTS

| JP | 64-86117 | 3/1989 |
| JP | 2-223935 | 9/1990 |

\* cited by examiner

Primary Examiner—Kenneth J. Ramsey
(74) Attorney, Agent, or Firm—Fitzpatrick, Cella, Harper & Scinto

(57) ABSTRACT

An electrophoretic display device distributes an electrophoretic liquid mixture containing electrophoretic particles to respective pixels in substantially equal amounts, thereby obviating a display density fluctuation due to a difference in distributed amount of the electrophoretic particles at the respective pixels. The equal distribution is performed through a process including the use of a temporary adsorbing member carrying the electrophoretic particles in an electrostatically adsorbed form in a pattern corresponding to an arrangement pattern, followed by transfer of the electrophoretic particles to the respective pixels, or a process including distribution of a distribution liquid containing the electrophoretic particles to the respective pixels followed by a step of adding the dispersion liquid.

7 Claims, 10 Drawing Sheets

PROCESS FOR PRODUCING DISPLAY DEVICE

FIELD OF THE INVENTION AND RELATED ART

The present invention relates to a process for producing a display device wherein electrophoretic particles or charged migrating particles are moved to effect a display.

In recent years, accompanying the progress of data processing apparatus, there has been an increasing demand for a display device requiring a small power consumption and a small thickness, and extensive study and development have been made on devices satisfying such a demand. Among these, a liquid crystal display device wherein an alignment of liquid crystal molecules is electrically controlled to change optical characteristics has been extensively developed and commercialized as a display device satisfying the demand described above.

As another type of display device, an electrophoretic display device has been proposed by Harold D. Less, et al. (U.S. Pat. No. 3,612,758). FIGS. 8A and 8B illustrate a structure and an operation principle of the electrophoretic display device. Referring to these figures, a display device P3 includes a pair of substrates 1a and 1b disposed with a prescribed gap therebetween and having electrodes 36 and 37, respectively, thereon. The gap between the substrates 1a and 1b is filled with a mixture of positively charged and colored multitude of electrophoretic particles 5 and a dispersion liquid 4 containing a dye so as to be colored in a color different from that of the electrophoretic particles 5. Further, partitioning walls 3 are disposed to divide the gap between the substrates into a plurality of pixels 2 (only one of which is shown in FIGS. 8A and 8B) arranged over an extension of the substrates while preventing the localization of the electrophoretic particles 5 and determine the gap between the substrates 1a and 1b.

In such a display device P3, when a positive voltage is applied to an upper electrode 36 (as shown) relative to a negative voltage applied to a lower electrode 37, the positively charged electrophoretic particles 5 are moved to be collected so as to cover the lower electrode 37, whereby the pixel exhibits the color of the dispersion liquid 4 when the pixel (display device) is viewed in an indicated arrow A direction (FIG. 8A). On the other hand, when a negative voltage is applied to the upper electrode 36 relative to a positive voltage relative to the lower electrode 37, the positively charged electrophoretic particles 5 are moved and collected to cover the upper electrode 36, whereby the pixel exhibits the color of the electrophoretic particles 5 when the pixel (display device) is viewed in the arrow A direction (FIG. 8B). By effecting such a drive for each of the plurality (or multitude) of pixels, an arbitrary picture is displayed on the display device.

In the above-described display device P3, it is desired that the respective pixels 2 exhibit a substantially uniform color density, and for this purpose, the electrophoretic particles are distributed in substantially equal quantities to the respective pixels. Several processes have been proposed as follows.

Japanese Laid-Open Patent Application (JP-A) 64-86117 has disclosed a process wherein the partitioning walls 3 are formed of a material that is swollen (to increase its volume) by impregnation with the dispersion liquid 4, and the electrophoretic particles 5 are dispersed together with the dispersion liquid 4 over the partitioning walls 3 before the swelling thereof, followed by swelling of the walls 3 to form the pixels 2.

JP-A 2-223935 has disclosed a process wherein one substrate 1a (or 1b) provided with the partitioning walls 3 is dipped within the dispersion liquid 4 containing the electrophoretic particles dispersed therein, and in this state, a flexible film constituting the other substrate 1b (or 1a) is sequentially press-bonded to the substrate 1a (or 1b).

However, even by any of the above processes, there is a certain limit for distribution of the electrophoretic particles 5 in substantially equal amounts to the respective pixels, whereby the respective pixels 2 are caused to exhibit somewhat different color densities, thus resulting in an inferior display quality.

The reason for difficulty of distribution in substantially equal amounts of the electrophoretic particles 5 to the respective pixels is as follows. In the above-described former process, the dispersion liquid 4 is distributed or injected from one side to the other side over an extension of the substrate, but as the charged electrophoretic particles 5 are contained therein, the particles are attached to the surfaces of the substrate and the partitioning walls 3, whereby the particles 5 fail to uniformly reach the corners of the substrate but are liable to form a density distribution which is higher at the upstream side and lower at the downstream side. On the other hand, in the latter process, due to various factors, such as different heights of the walls 3 or a fluctuation in pressing force for sequentially press-bonding the flexible film, the amounts of the dispersion liquid 4 distributed to the respective pixels are liable to be different, thus causing corresponding differences in amounts of the electrophoretic particles 5 distributed to the respective pixels 2.

SUMMARY OF THE INVENTION

Accordingly, a principal object of the present invention is to provide a process for producing a display device in which electrophoretic particles as a displaying medium are distributed evenly to respective pixels, thereby obviating a deterioration of display quality.

According to the present invention, there is provided a process for producing a display device of the type comprising: a pair of substrates disposed opposite to each other with a gap therebetween, partitioning walls disposed to divide the gap so as to define a plurality of pixels arranged along an extension of the substrates, an electrophoretic mixture comprising a dispersion liquid and a multitude of charged electrophoretic particles distributed to each pixel, and a first electrode and a second electrode disposed at each pixel so as to face the electrophoretic mixture; the process comprising:

placing an adsorbing member to which the electrophoretic particles have been temporarily adsorbed in a position opposite to one of the pair of substrates, and transferring the electrophoretic particles onto the one substrate.

According to another aspect of the present invention, the above-mentioned display device is produced through a process comprising:

forming the partitioning walls on one of the pairs of substrates before the substrates are disposed with the prescribed gap therebetween to thereby define the plurality of pixels, and distributing a distribution liquid containing the electrophoretic particles dispersed therein to the respective pixels in substantially equal amounts.

These and other objects, features and advantages of the present invention will become more apparent upon a consideration of the following description of the preferred

DESCRIPTION OF THE PREFERRED EMBODIMENTS (First Embodiment)

Figure 1:
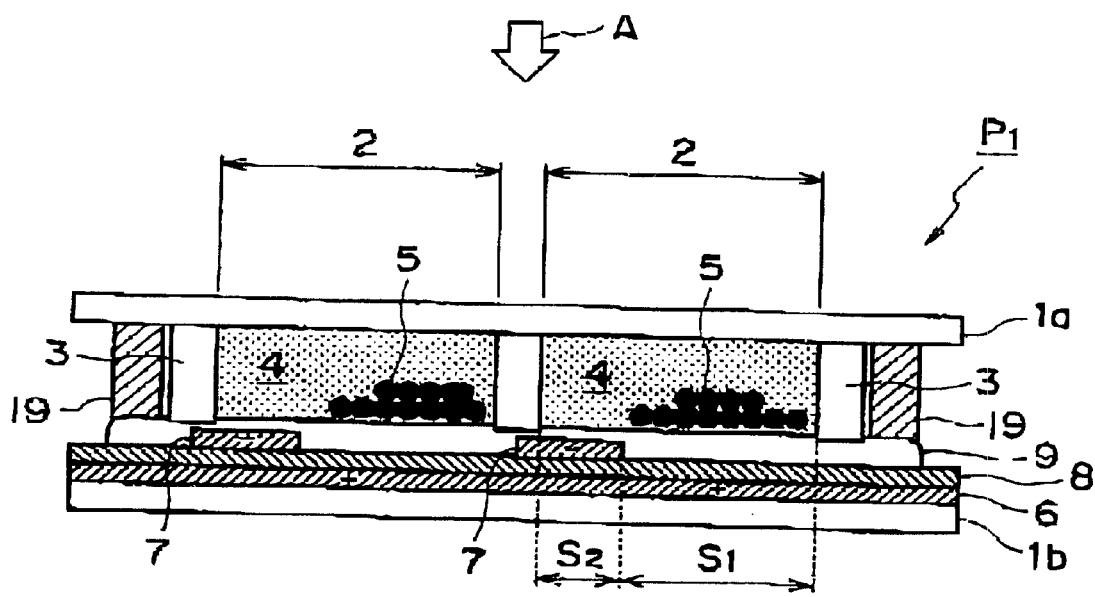
FIGS. 1 and 2 are respectively a sectional view of an example of a display device produced according to the invention.
Figure 2:
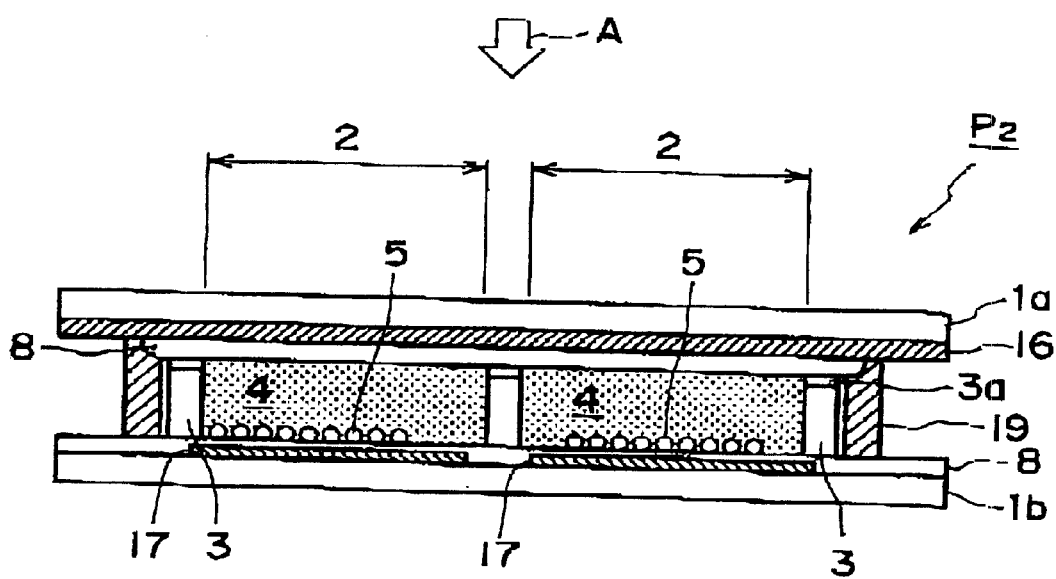

As illustrated in FIGS. 1 and 2, a display device according to the present invention may comprise a pair of substances 1a and 1b disposed opposite to each other with a prescribed gap or therebetween, partitioning walls 3 disposed to divide the prescribed gap so as to define a plurality of pixels 2 arranged over an extension of the substrates 1a and 1b, an electrophoretic mixture comprising a dispersion liquid 4 and a multitude of electrophoretic particles 5 distributed to the respective pixels, and a first electrode 6 (or 16 in FIG. 2) and a second electrode 7 (or 17 in FIG. 2) disposed at each pixel as as to face the electrophoretic mixture. The electrophoretic particles 5 have been charged to a prescribed polarity.

In this instance, the first and second electrodes may be disposed on the same substrate 1b as indicated by 6 and 7 in FIG. 1 or on different substrates 1a and 1b as indicated by 16 and 17 in FIG. 2.

In the case where the first electrode 6 and the second electrode 7 are supported on the same substrate 1b, the first electrode 6 may have an exposed portion of area S1 which is larger than an exposed portion of area S2 of the second electrode 7, and a portion of the first electrode 6 facing the electrophoretic dispersion liquid 4 is colored into a first color (e.g., white or non-colored transparency in a transmission-type device) while the electrophoretic particles 5 may be colored in a second color (e.g., black). Herein, it is sufficient that the first color is provided to the portion of the first electrode 6 facing the electrophoretic dispersion liquid 4, and for this purpose, the first electrode 6 may be coated with a colored film (e.g., electrode protecting film). In this case, a pixel 2 where the electrophoretic particles 5 are collected to cover the first electrode 6, is caused to display the second color (e.g., black) as shown in FIG. 1, and a pixel where the electrophoretic particles 5 are collected to cover the second electrode 7 is caused to display the first color (e.g., white). The display contrast in this case remarkably depends on a ratio of exposed areas of the second electrode 7 and the first electrode 6 (=exposed area of the second electrode 7/exposed area of the first electrode 6), and a larger value of the exposed area ratio provides a smaller contrast and a smaller value of the exposed area ratio provides a larger contrast. In order to realize a large contrast, the exposed area ratio may be preferably around 1/3–1/5. In the example show in FIG. 1, the first electrode 6 is disposed so as to overlap the second electrode 7 with an insulating layer 8 therebetween. This is however not essential, and the electrodes 6 and 7 can be disposed without overlapping.

On the other hand, in the case shown in FIG. 2 where the first electrode 16 and second electrode 17 are supported on the different substrates 1a and 1b, respectively, at least one electrode 16 (disposed on the viewer's side) may be made transparent and formed substantially over the entire area of each pixel (not necessarily over the entire substrate), and the electrophoretic dispersion liquid 4 may be colored with a pigment into a first color (e.g., blue) and the electrophoretic particles 5 may be colored in a second color (e.g., black). In this case, at a pixel 2 where the electrophoretic particles 5 are collected to cover the electrode 17 as shown in FIG. 2, only the color of the dispersion liquid 4 can be recognized when the device P2 is viewed in an indicated arrow A direction to display the first color of the dispersion liquid 4 without the recognition of the electrophoretic particles 5. On the other hand, at a pixel where the electrophoretic particles 5 are collected to cover the first electrode 16, only the electrophoretic particles 5 colored in the second color are recognized to display the second color without the recognition of the dispersion liquid 4. In this case, the display contrast does not depend on the exposed area ratio between the first electrode 16 and second electrode 17, so that at least one electrode 16 need be formed over substantially the entire pixel 2, and the exposed area ratio between the electrodes need not be adjusted from the viewpoint of display contrast. More specifically, from the viewpoint of display contrast, it is unnecessary for the other electrode 17 have a smaller exposed area than one electrode, but both electrodes 16 and 17 may for example be formed over the entire area of each pixel 2.

Incidentally, regardless of whether the first electrodes 6, 16 and second electrodes 7, 17 are disposed on the same substrate 1b or on different substrates 1a and 1b, the electrodes 6, 7, 16 and 17 may be disposed in contact with or free from contact with the substrates 1a and 1b. The electrodes 6, 7, 16 and 17 may be coated with an insulating layer 8 or an electrode protective layer 9 or provided with a black matrix pattern.

The polarity of a voltage applied between the first electrode 6 and the second electrode 7 (or between the first electrode 16 and the second electrode 17) can be controlled independently at the respective pixels 2. This is accomplished by, e.g., a scheme of forming both first electrode 6 and second electrode 7 (or first electrode 16 and second electrode 17) in the form of dots at the respective pixels 2 and applying arbitrary polarities of voltages to the electrodes 6, 7 or 16, 17, or a scheme (not shown) of forming one electrode 6 (or 16) as a common electrode over the entire area of the substrate 1a or 1b and forming the other electrodes 7 (or 17) in the form of dots at the respective pixels as shown in FIGS. 1 and 2 so as to apply arbitrary polarities of voltages to the other electrodes 7 (or 17) while placing the common electrode 6 (or 16) at a reference potential as by grounding. The magnitude of the applied voltage can be adjusted depending on the charge quantity of the electrophoretic particles 5 and electrode pitch, but may be ordinarily on the order of several tens of volts.

The display device P1 may be of either a transmission-type or a reflection-type. In case where the device P1 is viewed in the arrow A direction in FIG. 1, the first electrodes 6 may comprise a transparent electrode of, e.g., ITO (indium tin oxide) for a transmission-type display device P1 or may comprise a metal electrode of, e.g., Al, for a reflection-type display device P1. On the other hand, in the display device P2 shown in FIG. 2, the first electrodes 6 may comprise a transparent electrode of, e.g., ITO (indium tin oxide).

Further, the second electrodes 7 in the display device P1 of FIG. 1 may comprise a metal material, such as Al or Ti and may further preferably comprise a black-colored material, such as TiC.

The insulating layer 8 may comprise, e.g., acrylic resin or polyimide resin. In the case of a reflection-type display device, the insulating layer 8 may contain white fine particles of, e.g., alumina, so as to be provided with a function of a scattering layer.

The substrates 1a and 1b may ordinarily comprise glass sheets but may also comprise a plastic film of, e.g., polyethylene terephthalate (PET) or polyether sulfone, for providing a flexible display device.

The partitioning walls 3 may comprise silicone rubber, fluorine-containing rubber, acrylic rubber, etc., or photosensitive resins, etc.

The electrophoretic particles 5 may principally comprise polymeric resin, such as polystyrene or polyethylene, co-kneaded with a colorant, such as carbon; particles of pigments, such as titanium oxide or aluminum oxide, optionally coated with a polymeric resin. An additive, such as a charge control agent may be admixed as desired. The electrophoretic particles may preferably have a particle size of 0.1–15 $\mu$m, more preferably 0.1–10 $\mu$m.

The electrophoretic dispersion liquid 4 may preferably comprise a low-resistivity liquid in which the electrophoretic particles 5 are well charged. Examples thereof may include: silicone oil, xylene, toluene, aliphatic hydrocarbon oil, such as "Isopar" (trade name, available from Exxon Chemical America's Co.). The dispersion liquid 4 may be selected to have a relatively large specific gravity, as desired, comparable to that of the electrophoretic particles.

A plurality of adjacent pixels 2 in the display device may be arranged to display different colors so as to display full-color picture in combination of such colors.

Some embodiments of the process for producing such display devices P1 and P2 will be described with reference to FIGS. 3 to 5.

Figure 3A:
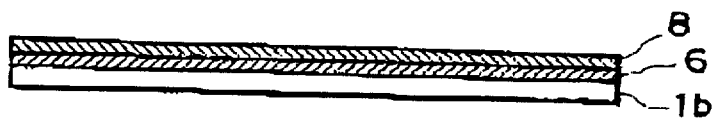
FIGS. 3A to 3F, 4A to 4E and 5A to 5F illustrate three embodiments of the process for producing a display device according to the invention.
Figure 3B:
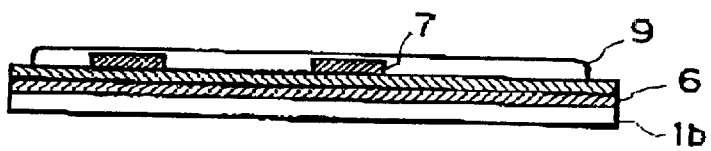
Figure 3C:
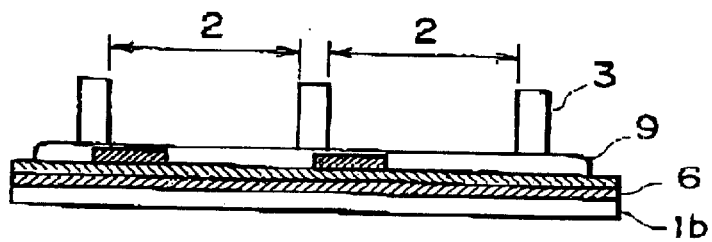
Figure 3D:
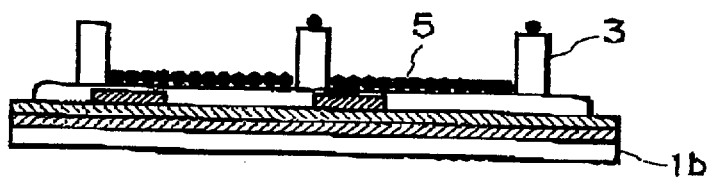
Figure 4A:
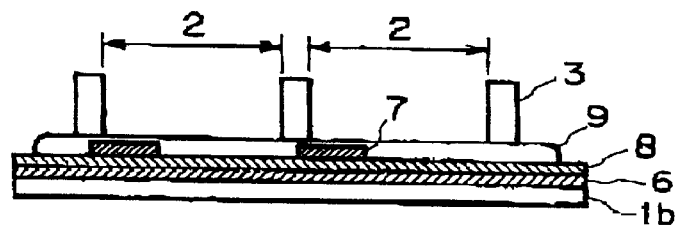
Figure 4B:
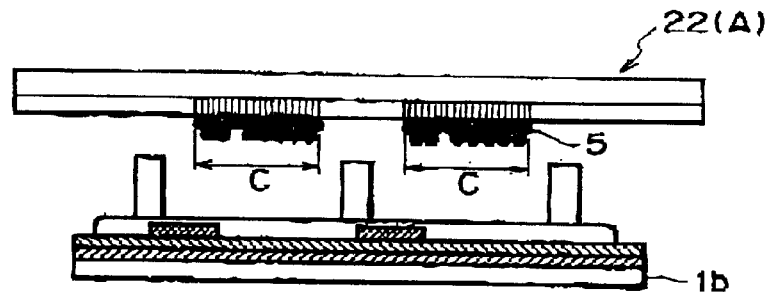
Figure 4C:
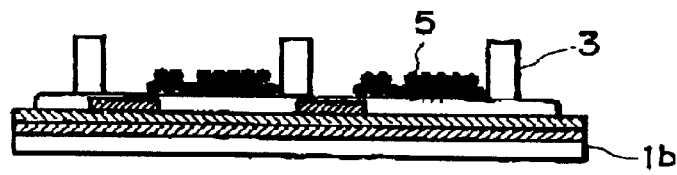
Figure 5A:
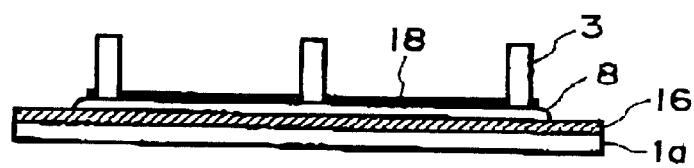
Figure 5B:
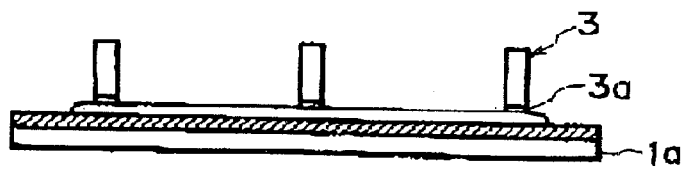
Figure 5C:
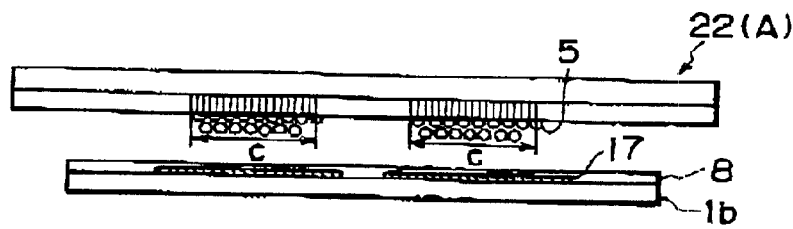
Figure 5D:

In production of such display devices P1 and P2, prior to disposition of the pair of substrates 1a and 1b in position with a prescribed gap therebetween, the above-mentioned multitude of electrophoretic particles 5 are disposed and attached onto one substrate 1a or 1b (FIGS. 3D, 4C and 5D).

The dispersion or spreading of the electrophoretic particles may be performed onto either a substrate on which partitioning walls 3 are formed (FIGS. 3D and 4C), or a substrate on which partitioning walls 3 are not formed (FIG. 5D).

In FIGS. 3D and 4C, the partitioning walls 3 are first formed and then the electrophoretic particles 5 are dispersed, but the electrophoretic particles 5 can be formed onto the substrate 1b (or 1a) before the formation of the partitioning walls 5, followed by formation of the partitioning walls 3 (not shown).

The dispersion of the electrophoretic particles 5 may be performed in any manner. It is however preferred as shown in FIGS. 4B and 5C that the electrophoretic particles 5 charged to one polarity are temporarily adsorbed onto an adsorbing member or sheet 22(A), the adsorbing sheet 22(A) carrying the electrophoretic particles 5 is disposed in position opposite to one substrate 1b (or 1a), and then the electrophoretic particles 5 are caused to jump from the adsorbing sheet 22(A) onto one substrate 1b (or 1a).

The electrophoretic particles 5 may preferably be adsorbed at positions C on the adsorbing sheet 22(A) corresponding to the respective pixels of a display device. Herein, the "positions C corresponding to the respective pixels of a display device" refer to positions opposite to the respective pixels in case where such pixels have been defined by partitioning walls 3 as shown in FIG. 4C or positions opposite to parts on the substrate where respective pixels will be formed in case where the dispersion is performed onto the substrate before the formation of the partitioning walls 3.

Figure 6:
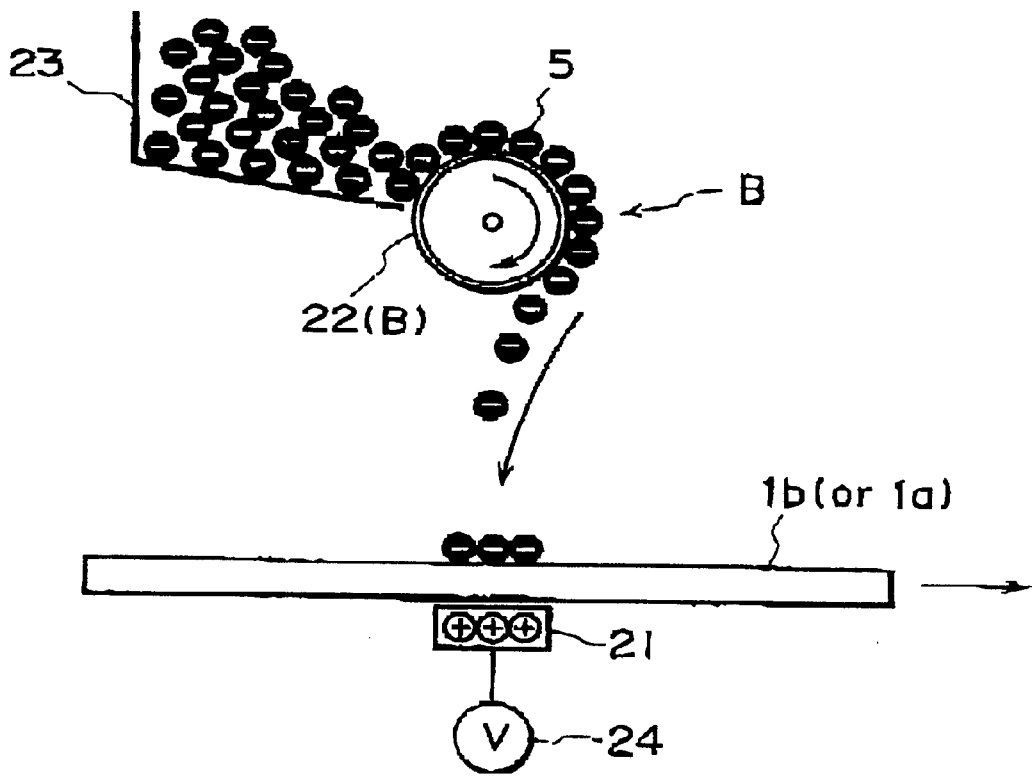
FIGS. 6 and 7 respectively illustrate a step and a device for dispersing charged electrophoretic particles.
Figure 7:
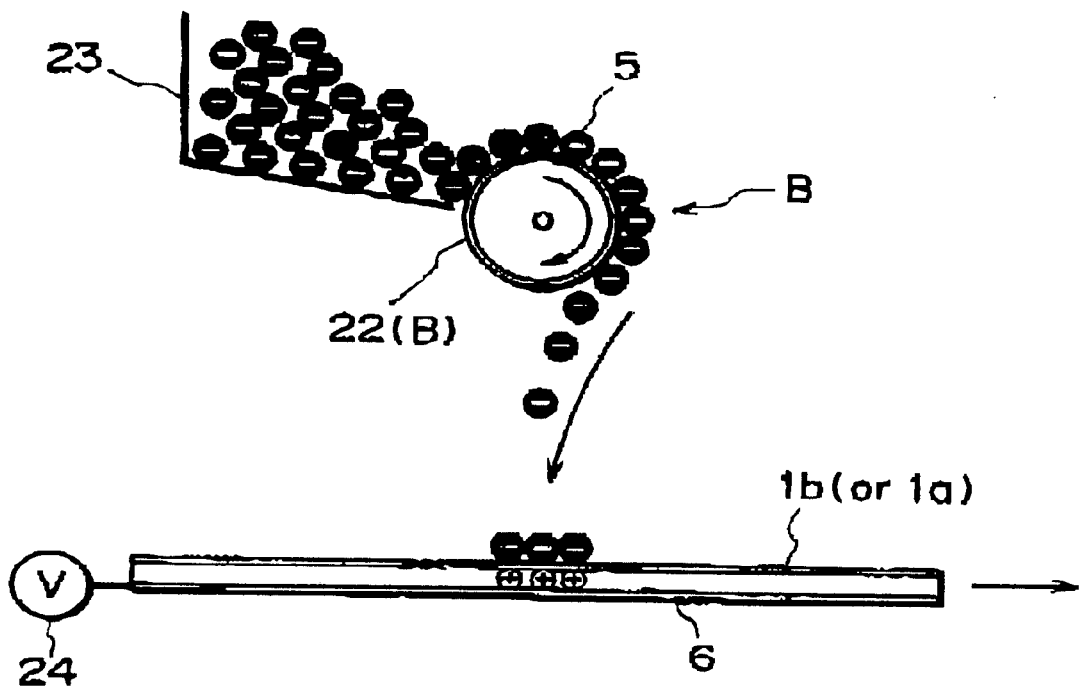
Figure 8A:
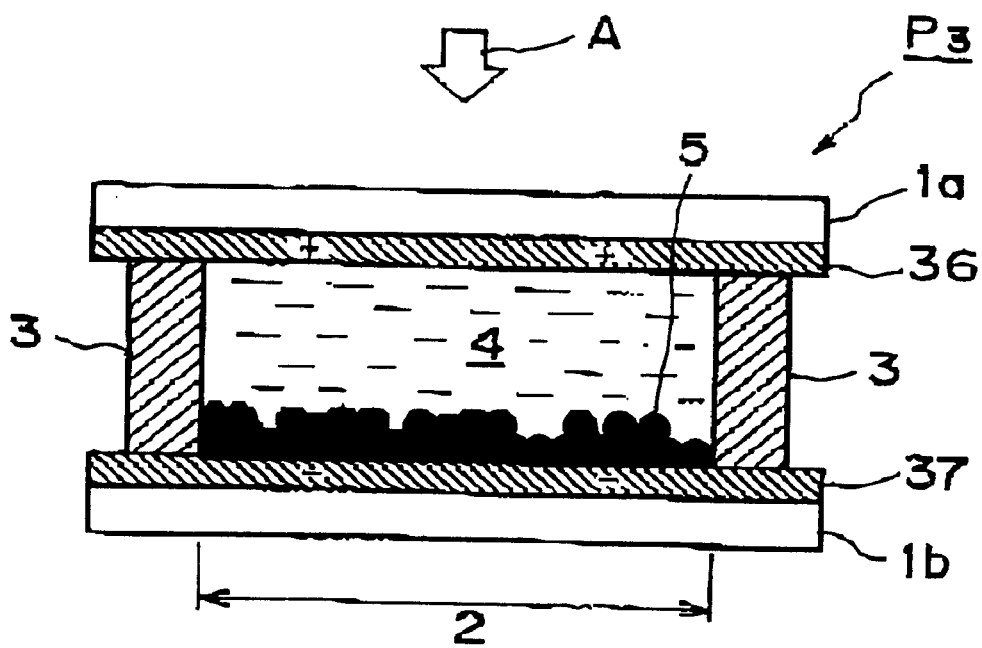
FIGS. 8A and 8B illustrate a structure and an operation principle of an electrophoretic display device.
Figure 8B:
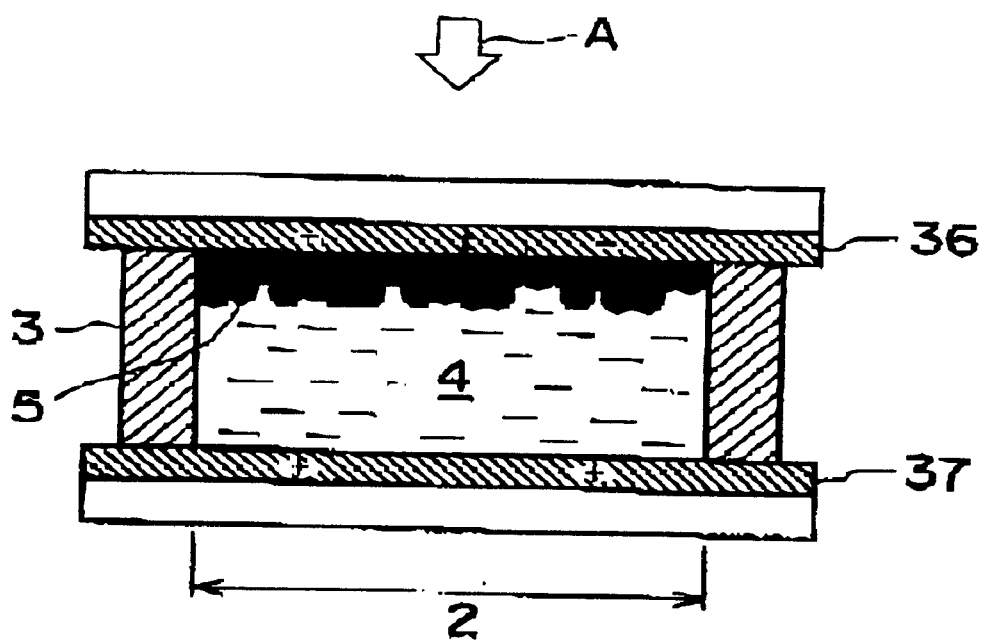

Herein, while the case of the adsorbing member 22(A) being in the form of a sheet (which may be referred to as an "adsorbing sheet") is illustrated in FIGS. 4B and 5C, this is not essential but the adsorbing member may also be in the form of a drum 22(B) (which may be referred to as an "adsorbing drum") as shown in FIGS. 6 and 7.

Incidentally, in the case where the electrophoretic particles 5 are caused to jump from the adsorbing member 22 onto one substrate 1b (or 1a), it is necessary that the portions C (adsorption regions C) of the adsorbing member 22 at which the electrophoretic particles are adsorbed correspond to the respective pixels 2 (or positions where the respective pixels will be formed in the case where the electrophoretic particles 5 are dispersed onto a substrate on which respective pixels have not been formed as shown in FIG. 5D). In the case where the adsorbing sheet 22(A) is used, the adsorbing sheet 22(A) may be disposed at a prescribed position with respect to one substrate 1b (or 1a). On the other hand, in the case where an adsorbing drum 22(B) is used, the adsorbing drum 22(B) may be driven in rotation in synchronism with the movement of one substrate 1b (or 1a) along the circumferential surface thereof similarly as a photosensitive drum or an intermediate transfer member used in an electrophotographic copying machine.

The adsorption of the electrophoretic particles 5 onto an adsorbing member 22(A) or 22(B) may be effected by (a) forming the surface layer of the adsorbing member with a photosensitive layer-forming material for an electrophotographic photosensitive drum, (b) uniformly charging the adsorbing member 22(A) or (B) and illuminating the charged adsorbing member 22(A) or (B) with laser light, etc., to effect partial discharge and leave an electrostatic latent image at portions C on the adsorbing member 22(A) or 22(B), and causing charged electrophoretic particles to be adsorbed at the electrostatically charged portions C on the adsorbing member 22(A) or 22(B).

The adsorption amount of the charged electrophoretic particles 5 per unit area of the adsorbing member may be controlled by controlling the charged quantity on the adsorbing member, so that the adsorption quantity of electrophoretic particles 5 may be equalized or varied at the respective regions C.

The charged electrophoretic particles 5 adsorbed on the adsorbing member may be caused to jump onto one substrate 1b (or 1a) by (i) discharging the adsorbing member or (ii) charging one substrate 1b (or 1a) to a polarity opposite to that of the charged electrophoretic particles 5 by supplying a voltage to an adsorption electrode 21 disposed in proximity to the substrate 1b (or 1a) from a voltage source 24 so as to generate an electrostatic attraction force for causing the jumping of the electrophoretic particles 5 supplied from a charged electrophoretic particle supply mechanism 23 as shown in FIG. 6.

In the embodiment shown in FIG. 6, the adsorption electrode 21 is disposed in separation from and on a back side of the substrate 1b (or 1a). This is not essential however. For example, as shown in FIG. 7, the above-mentioned first electrodes 6 may be formed on the substrate 1b (or 1a) prior to dispersion of the charged electrophoretic particles 5 so as to use the electrodes 6 per se as the adsorption electrode during the dispersion by applying a voltage of opposite polarity to that of the charged electrophoretic particles 5.

The distribution of the electrophoretic dispersion liquid 4 to the respective pixels 2 may be performed after the dispersion of the charged electrophoretic particles 5 (i.e., after the jumping of the charged electrophoretic particles 5 from the adsorbing member 22 onto the substrate 1b (or 1a)).

Figure 3E:
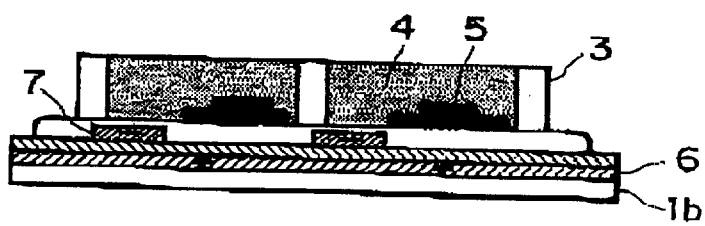
Figure 3F:
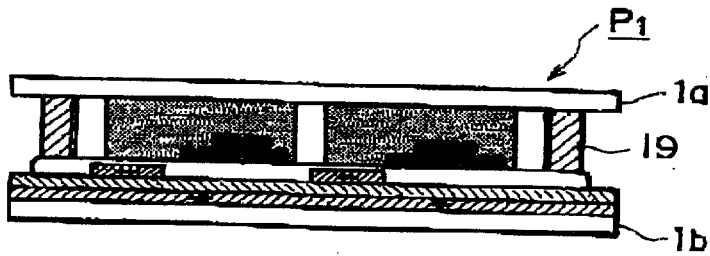
Figure 4D:
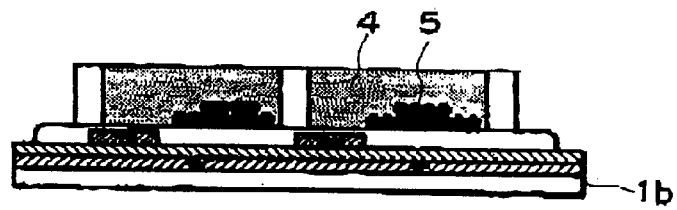
Figure 4E:
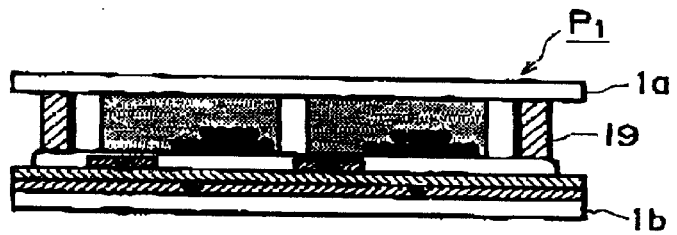
Figure 5E:
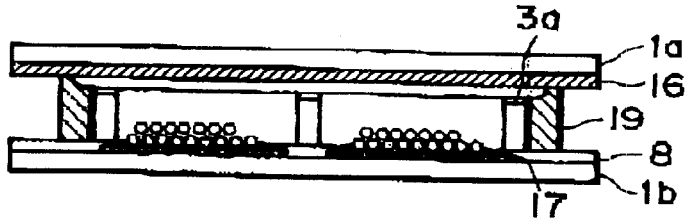
Figure 5F:
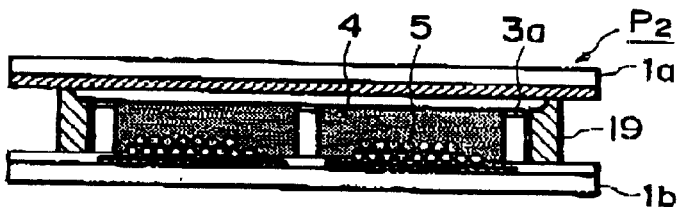

Further, the distribution of the dispersion liquid 4 to the respective pixels 2 may be performed prior to setting of the substrates 1a and 1b with a prescribed gap therebetween (i.e., the formation of cells, as shown in FIG. 3E and FIG. 4D) or after setting of the substrates 1a and 1b with a prescribed gap (as shown at FIGS. 5E to 5F).

In the latter case where the dispersion liquid 4 is distributed after setting of the pair of substrates 1a and 1b with a prescribed gap, it is necessary that the partitioning walls 3 are provided with a through-hole or perforation 3a (as shown in FIG. 5E, preferably in a size allowing the passage of the electrophoretic particles 5) so as to make the respective pixels 2 communicative with each other. Such perforations 3a may for example be formed by forming a line or lines of perforation-forming resist pattern 18 from one to the other edge of a substrate as shown in FIG. 5A, forming a pattern of partitioning walls 3 over the resist pattern 18 and then removing the resist pattern 18, e.g., by dissolution. Incidentally, in case where the first electrode 16 and the second electrode 17 are disposed on separate substrates 1a and 1b, such a perforation 3a may preferably be formed at a position which is close to one electrode (16 in FIG. 2) and remote from the other electrode (17 in FIG. 2) so that the electrophoretic particles 5 are brought close to the side of the electrode remote from the perforation 3a and prevented from plugging the perforations 3a to obstruct the injection of the dispersion liquid 4 through the perforation 3a.

In the case where the dispersion liquid 4 is distributed after the electrophoretic particles 5 have been distributed to the respective pixels 2, it is preferred to prevent the movement of the electrophoretic particles 5 between the respective pixels 2 thereby impairing the equal distribution state, by forming at least one of the first electrode 6 (or 16) and second electrode 7 (or 17) and the partitioning walls 3 on one substrate 1a or 1b before the dispersion of the electrophoretic particles 5 onto one substrate 1a or 1b and distributing the dispersion liquid 4 under a state that the electrophoretic particles 5 are electrostatically adsorbed onto the electrodes by applying a voltage to the electrodes; or by introducing a vapor of the dispersion liquid 4 to the respective pixels 2 after bonding of the substrates and then cooling the vapor into the dispersion liquid 4.

According to this embodiment, the electrophoretic particles 5 are distributed to the respective pixels 2 in substantially equal amounts, so that the respective pixels 2 are caused to display substantially equal densities of colors of the particles, thus providing a display device with an improved display quality.

Further, by distributing the dispersion liquid 4 to the respective pixels 2 under a state where at least one of the first electrode 6 and second electrode 7 at each pixel 2 is supplied with a voltage to electrostatically attract the already distributed electrophoretic particles thereto, it becomes possible to retain the state of distribution in equal amounts of the electrophoretic particles b at the respective pixels 2.

Further, as the electrophoretic particles 5 adsorbed onto an adsorbing member 22(A) or 22(B) in a manner similar to electrophotography are caused to jump or be transferred onto the respective pixels, the adjacent pixels 2 can be provided with electrophoretic particles 5 of different colors, thus providing a display device capable of full-color picture display in a simple manner.

(Second Embodiment)

Other processes for production of display devices P1 and P2 shown in FIGS. 1 and 2 according to this embodiment will be described with reference to FIGS. 10, 11 and 12.

In preparation of such display devices P1 and P2, prior to disposition of a pair of substrates 1a and 1b in position with a prescribed gap therebetween, partitioning walls 3 are formed on one of the substrates 1a and 1b (1b in FIGS. 10A, 11A and 12A) to form a plurality of pixels 2.

Then, a distribution liquid L containing electrophoretic particles 5 dispersed there is injected in substantially equal amounts into the respective pixels 2 (FIGS. 10B, 11B and 12B), e.g., by using a nozzle N as shown. The distribution liquid L may comprise the above-mentioned electrophoretic dispersion liquid 4 per se or another volatile liquid such as alcohol, (e.g., as shown in FIG. 11) in addition to the electrophoretic particles 5. The amount of the distribution liquid L may be controlled so as to provide a constant density of the electrophoretic particles 2 per unit area of the respective pixels 2.

Figure 10A:
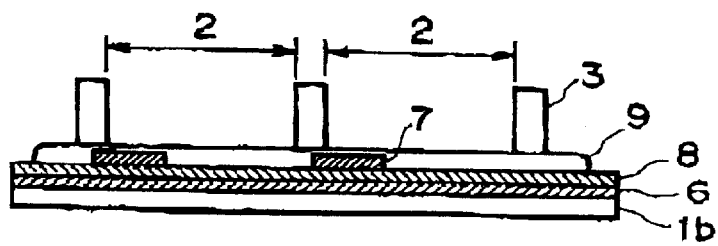
Figure 10B:
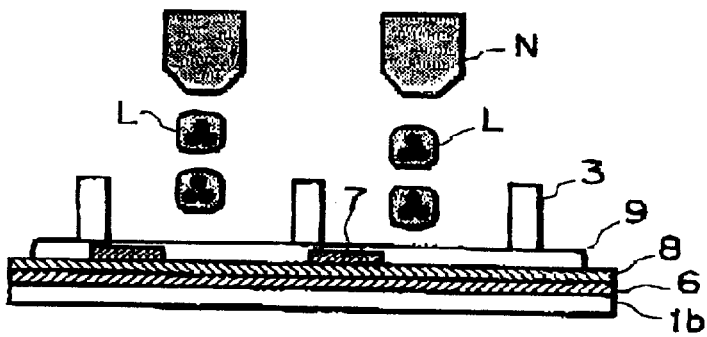
Figure 10C:
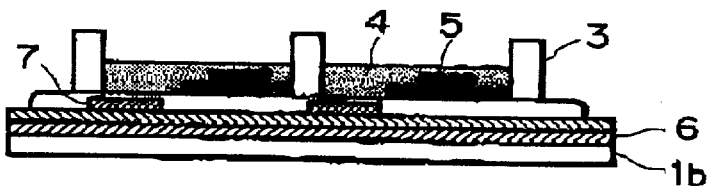
Figure 10D:
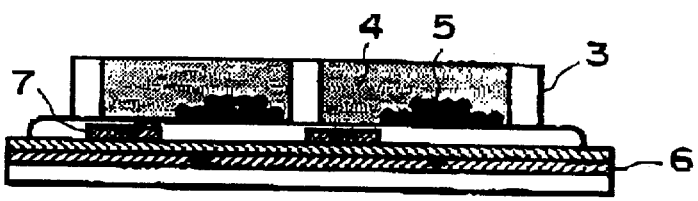
Figure 10E:
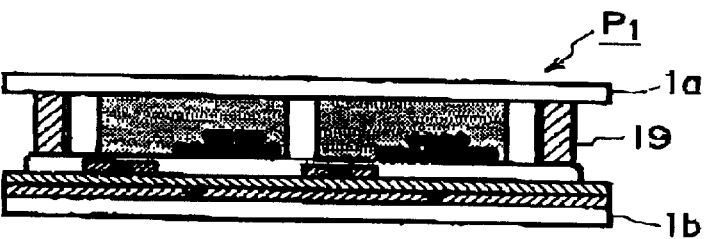
Figure 12A:
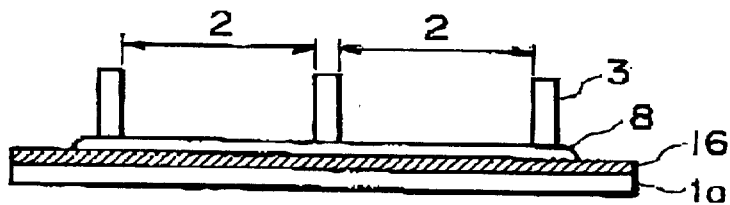
Figure 12B:
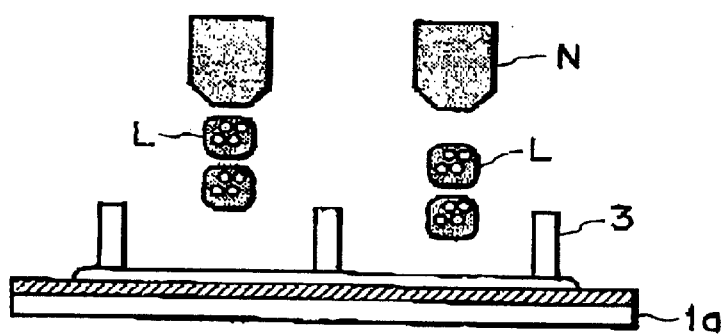
Figure 12C:
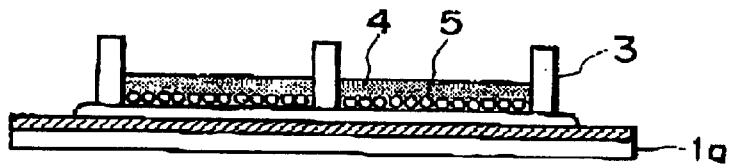
Figure 12D:
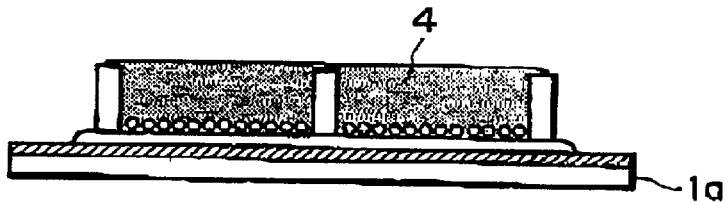

In case where the electrophoretic dispersion liquid 4 per se is used for constituting the distributing liquid L, it is preferred to first inject the distribution liquid L in an amount insufficient to fill up the respective pixels 2 (FIGS. 10C and 12C) and further inject an additional amount of the dispersion liquid 4 to fill up the respective pixels 2 (FIGS. 10D and 12D).

Figure 11A:
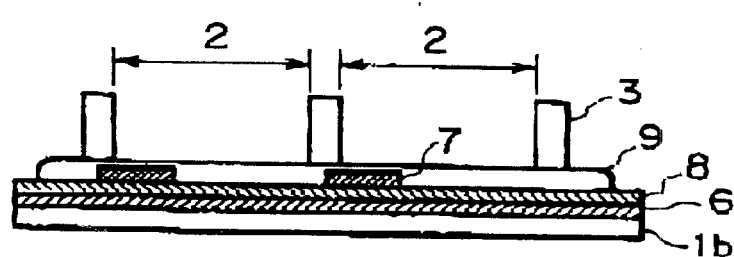
Figure 11B:
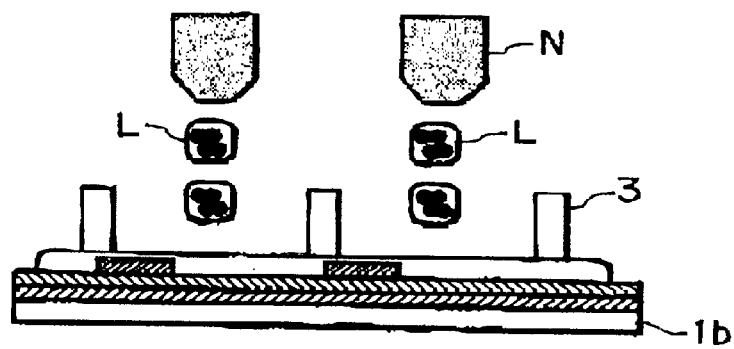
Figure 11C:
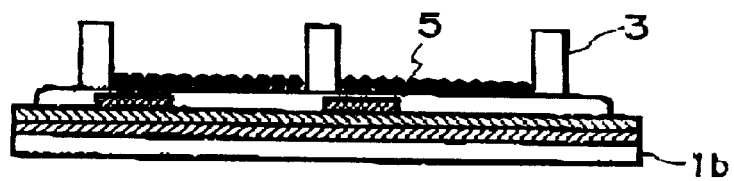
Figure 11D:
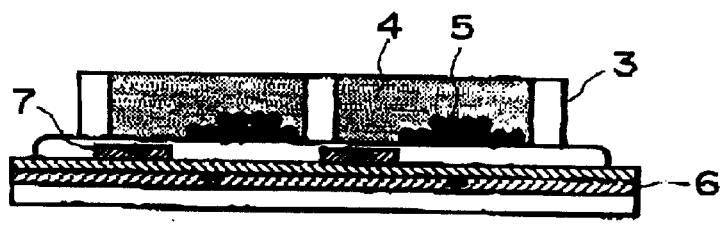
Figure 11E:
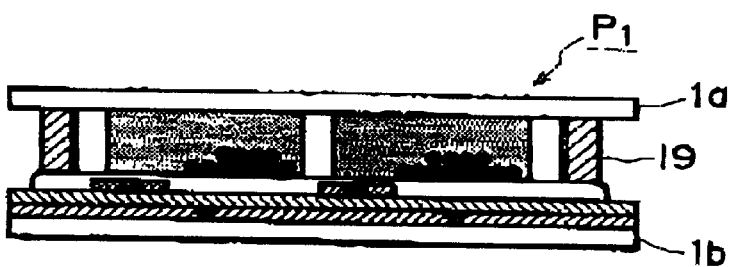

On the other hand, in the case where a volatile liquid other than the electrophoretic dispersion liquid 4 is used to constitute the distribution liquid L, the substrate 1b having received the distribution liquid L in the respective pixels 2 is subjected to evaporation of the volatile liquid, e.g., by heating, prior to disposition of the other substrate 1a (FIG. 11C), and then the electrophoretic particle dispersion liquid 4 may be distributed to the respective pixels 2 (FIG. 11D).

The distribution of the dispersion liquid 4 alone (FIGS. 10D, 11D and 12D) can also be performed after disposing the other substrate 1a in position with a prescribed gap with the substrate 1b. In this case, it is preferred to prevent the movement of the electrophoretic particles 5 already distributed to the respective pixels 2 between the respective pixels 2 thereby impairing the equal distribution state, by distributing the dispersion liquid 4 under a state that the electrophoretic particles 5 are electrostatically adsorbed onto the electrodes by applying a voltage to at least one the electrodes 6 (or 16) or 7 (or 17); or by introducing a vapor of the dispersion liquid 4 to the respective pixels 2 after bonding of the substrates and then cooling the vapor into the dispersion liquid 4.

According to this embodiment, the electrophoretic particles 5 are distributed to the respective pixels 2 in substantially equal amounts by distributing substantially equal amounts of the distribution liquid L containing the electrophoretic particles 5, so that the respective pixels 2 are caused to display substantially equal densities of colors of the particles, thus providing a display device with an improved display quality.

Hereinbelow, the present invention will be described in further detail based on specific examples.

EXAMPLE 1

A display device P1 having a partial structure as shown in FIG. 1 was prepared through a process as illustrated in FIGS. 3A–3F.

More specifically, a first electrode 6 was formed over an entire surface of one substrate 1a, and further thereon were successively formed an insulating layer 8, second electrodes 7 and an electrode protection layer 9.

The substrates 1a and 1b were formed of polyethylene terephthalate (PET) films having thickness of 100 μm and 150 μm respectively. The first electrode 6 was formed of 0.5 μm-thick aluminum (Al) so as to also function as a reflection electrode. The insulating layer 8 was formed of 4 μm-thick acrylic resin containing alumina fine particles dispersed therein for allowing the layer to function also as a dispersion layer. The second electrodes 7 were formed of 0.3 μm-thick dark black-colored TiC (titanium carbonate). The partitioning walls 3 were formed of silicone rubber, and the electrophoretic particles 5 were formed as negatively chargeable 2 μm-dia. black particles comprising polystyrene as a principal component in mixture with carbon and a charge control agent. The electrophoretic dispersion liquid 4 was formed of transparent silicone oil.

For preparation of the display device P1, the first electrode 6 was formed over an entire surface of one substrate 1b and further coated with the insulating layer 8 (FIG. 3A). On the insulating layer, a TiC film was formed by sputtering, and 70% thereof for each pixel was removed by photolithography including dry etching to form 0.3 μm-thick second electrodes 7 in the form of dots (FIG. 3B), which were then coated with a 30 μm-thick electrode protection layer 9 of acrylic resin on which were further formed of 10 μm-high partitioning walls 3 in pattern to define pixels each measuring 120 μm×120 μm (FIG. 3C).

The negatively charged electrophoretic particles 5 were supplied to and attached in a pattern to an adsorbing drum (adsorbing member) 22B having a ca. 20 μm-thick surface OPC (organic photoconductor) layer, as shown in FIG. 6, which had been charged in a pattern by a sequence of uniform charging and laser light illumination, and then transferred onto the substrate 1b (in the state shown in FIG. 3C) which was backed by a positive transfer electrode 21 and moved horizontally in synchronism with the rotation of the adsorbing drum, whereby the electrophoretic particles 5 were distributed in substantially equal amounts to the respective pixels 2 (FIG. 3D).

Then, a voltage of +70 volts was applied to the first electrode 6 relative to the second electrodes 7 thereby attracting the electrophoretic particles 5 toward the first electrode 6 and, in this state, a transparent electrophoretic dispersion liquid 4 (of silicone oil) was injected to the respective pixels 2 in an amount of ca. 25 times by weight the electrophoretic particles 5 at each pixel (FIG. 3E). Further, while keeping the voltage application, another substrate 1a of 100 μm-thick PET film was applied to the substrate 1b via a sealing adhesive 19.

The thus-prepared display device P1 having a structure as shown in FIG. 1 was driven by application of a voltage of 40 volts between the electrodes 6 and 7, whereby a good display could be performed at a contrast of 5 and a response speed of 20 msec. As the electrophoretic particles 5 were negatively charged, the electrophoretic particles were collected at exposed parts of the first electrode 6 when the first electrode 6 was supplied with a positive voltage while the second electrodes 7 were supplied with a negative voltage as shown in FIG. 1. In this state, the indicated pixels 2 displayed a black state as the second electrodes 7 and the electrophoretic particles 5 were both black-colored. On the other hand, if the electrodes 6 and 7 were supplied with reverse-polarity voltages, the electrophoretic particles 5 were collected at positions above the second electrodes 7 to effect white display.

During the drive, no density fluctuation among the respective pixels 2 were observed, whereby a good display quality was attained.

EXAMPLE 2

A display device P1 having a partial structure as shown in FIG. 1 was prepared through a process as illustrated in FIGS. 4A–4E.

A substrate structure as illustrated in FIG. 4A identical to the one shown in FIG. 3C was prepared by forming an first electrode 6, an insulating layer 8, second electrodes 7, and electrode protection layer partitioning walls 3 on one substrate 1b in the same manner as in Example 1.

The same electrophoretic particles 5 and dispersion liquid 4 as used in Example 1 were provided.

An adsorbing sheet 22(A) having a ca. 20 μm-thick surface OPC layer as an adsorbing member was charged in a pattern C corresponding to an arrangement pattern of pixels 2 on the substrate 1b by a sequence of uniform charging and laser light illumination, and the charged electrophoretic particles 5 were attached to the charged pattern C on the adsorbing sheet 22(A), followed by alignment of the absorbing sheet 22(A) with the substrate 1b so that the charged and attached electrophoretic particles 5 faced the respective pixels 2 (FIG. 4B) and jumping of the electrophoretic particles 5 onto the respective pixels 2 by supplying a positive voltage to the first electrode 6 (FIG. 4C). This state is substantially identical to the state shown in FIG. 3D of Example 1.

Thereafter, the injection of the dispersion liquid 4 (FIG. 4D) and application of an opposite substrate 1a onto the thus treated substrate 1b (FIG. 4E) were performed in the same manner as in Example 1.

The thus-prepared display device exhibited similar performances as the one prepared in Example 1. Further, as the electrophoretic particles 5 were transferred to the respective pixels 2 while the adsorbing sheet 22(A) was in a still state, the transfer or jumping of the electrophoretic particles 5 could be controlled at a good accuracy, and the attachment of the particles 5 onto a part other than the pixels could be well prevented.

EXAMPLE 3

A display device P2 having a partial structure as shown in FIG. 2 was prepared through a process as illustrated in FIGS. 5A to 5F.

More specifically, as shown in FIG. 2, a first electrode 16 was formed on an entire surface of one substrate 1a, and second electrodes 17 were formed in a dot pattern at respective pixels, while coating the first electrode 16 and the second electrodes 27 respectively with insulating layers 8. Further, partitioning walls 3 were each provided with a perforation 3a at a position close to the first electrode 16 and remote from the second electrode 17, so that the respective pixels were communicative with each other. Each perforation was formed in a diameter which allows a movement therethrough of only the dispersion liquid 4 and not the electrophoretic particles 5.

The substrates 1a and 1b used comprised a polyether sulfone film provided with a gas barrier layer. The first electrode 16 comprises 0.3 μm-thick ITO, and the second electrodes 17 comprised 0.5 μm-thick Ti. The insulating layers 8 were each formed of 0.4 μm-thick acrylic resin, and the partitioning walls 3 were formed of 3 μm-thick polyimide resin. The electrophoretic particles 5 were formed as 3 μm-dia. positively chargeable white particles prepared by coating titanium oxide particles with a polymer containing a charge control agent. The dispersion liquid 4 comprised aliphatic hydrocarbon oil colored in blue with a blue pigment.

The display device P2 was prepared in the following manner with reference to FIGS. 5A to 5F.

A first electrode 16 was formed on an entire surface of a substrate 1a, and an insulating layer 8 was formed thereon. Further, a perforation-forming resist pattern 16 was formed on the insulating layer 8 so as to extend from one side of the other side of the substrate 1a. Further, partitioning walls 3 were formed over the resist pattern and patterned. Thereafter, the perforation-forming resist pattern 18 was removed by dissolution to form a perforation 3a through partitioning walls (FIG. 5B).

Then, second electrodes 17 were formed in a pattern on the other substrate 1b, and further coated with an insulating layer 8.

Then, in a manner similar as in Example 2, electrophoretic particles 5 were dispersed on the substrate 1b in substantially equal amounts for respective pixels 2 prepared later (FIGS. 5C and 5D).

Then, the substrates 1a and 1b treated in the above-described manner were applied to each other with a peripheral sealing adhesive 19 (FIG. 5E).

The peripheral sealing adhesive 19 was provided with the perforations at several parts thereof, through which the interior was evacuated to establish a vacuum and the electrophoretic dispersion liquid 4 was injected (FIG. 5F) while applying a voltage to the second electrodes 17 so as to attract the electrophoretic particles thereto and not to obstruct the injection of the dispersion liquid 4 by plugging of the perforations 3a. As a result, the dispersion liquid 4 was charged into the respective pixels 2 through the perforations 3a. Then, the perforations in the peripheral adhesive 19 were sealed.

In the display device P2, the first electrode 16 was grounded, and the second electrodes 17 were selectively supplied with a positive or a negative voltage. When the second electrodes 17 are supplied with a negative voltage, the positively charged electrophoretic particles 5 are collected to cover the second electrodes 17 as shown in FIG. 2, so that only the blue-colored dispersion liquid 4 is recognized when viewed in a direction A, thus providing blue display. On the other hand, when the second electrodes 17 are supplied with a positive voltage, the positively charged electrophoretic particles 5 are moved away from the second electrodes 17 to be collected on the first electrode 16. In this state, white display is performed by recognition of only the white electrophoretic particles 5 when the device P2 is viewed in arrow A direction.

As a result of actual drive of the display device P2 by application of voltages of 70 volts, a good display was performed at a contrast of 4 and a response speed of 200 msec. Good display quality was exhibited without density fluctuation among the respective pixels.

EXAMPLE 4

A display device P1 having a partial structure as shown in FIG. 1 was prepared through a process as illustrated in FIGS. 3A to 3F, i.e., in the same manner as in Example 1 except for using a dispersion system shown in FIG. 7, wherein the voltage for transfer of electrophoretic particles 5 was applied to the first electrode 6 of the substrate 1b, instead of the charging system shown in FIG. 6.

The thus-obtained display device exhibited similar performances as the one obtained in Example 1.

EXAMPLE 5

Figure 9A:
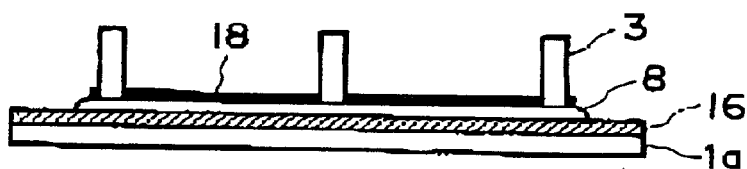
FIGS. 9A to 9F, 10A to 10E, 11A to 11E, and 12A to 12E, illustrate four other embodiments of the process for producing a display device according to the invention.
Figure 9B:
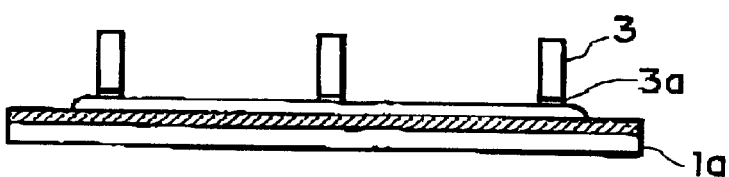
Figure 9C:
Figure 9D:
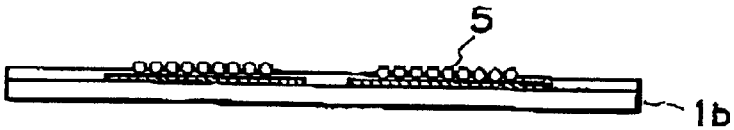
Figure 9E:
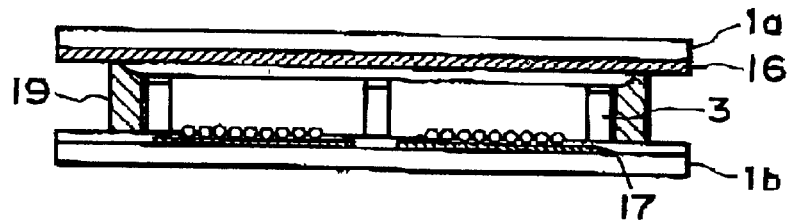
Figure 9F:
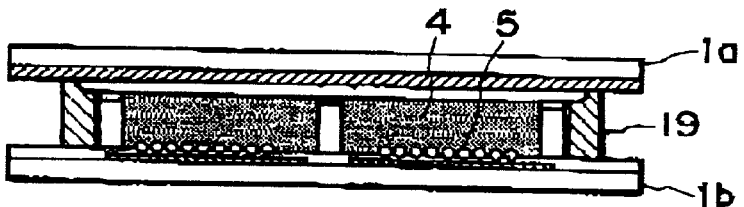

A display device P2 having a partial structure as illustrated in FIG. 2 was prepared through a process illustrated in FIGS. 9A–9F, i.e., in the same manner as in Example 3 except for using a dispersion system as shown in FIG. 7 (wherein the electrophoretic particles 5 were however positively charged and the electrodes 17 as shown in FIG. 9C instead of the electrodes 6 were charged positively) instead of using the temporary adsorbing sheet 22(A) shown at FIG. 5C, for dispersing the charged electrophoretic particles 5 on the substrate 1b as shown in FIG. 9D.

The thus-obtained display device P2 exhibited similar performances as the one of Example 3.

EXAMPLE 6

A display device P1 having a partial structure as shown in FIG. 1 was prepared through a process as illustrated in FIGS. 10A–10E.

More specifically, a first electrode 6 was formed over an entire surface of one substrate 1a, and further thereon were successively formed an insulating layer B, second electrodes 7 and an electrode protection layer 9.

The substrates 1a and 1b were formed of polyethylene terephthalate (PET) films. The first electrode 6 was formed of 0.5 $\mu$m-thick aluminum (Al) so as to also function as a reflection electrode. The insulating layer 8 was formed of acrylic resin containing alumina fine particles dispersed therein for allowing the layer to function also as a dispersion layer. The second electrodes were formed of dark black-colored TiC (titanium carbonate). The partitioning walls 3 were formed of silicone rubber, and the electrophoretic particles 5 were formed as negatively chargeable 1 $\mu$m-dia. particles comprising polystyrene as a principal component in mixture with carbon and a charge control agent. The electrophoretic dispersion liquid 4 was formed of transparent silicone oil.

For preparation of the display device P1, the first electrode 6 was formed over an entire surface of one substrate 1b and further coated with the insulating layer 8. On the insulating layer, a TiC film was formed by sputtering, and 70% thereof for each pixel was removed by photolithography including dry etching to form second electrodes 7 in the form of dots, which were then coated with an electrode protection layer 9 of acrylic resin on which were further formed partitioning walls 3 in pattern (FIG. 10A).

Separately, a distribution liquid L formed as a mixture of the electrophoretic dispersion liquid 4 and the electrophoretic particles in a weight ratio of 5:1 was distributed through nozzles N in equal amounts into respective pixels 2 so as to fill ca. 20% of each pixel 2. More specifically, the distribution liquid L was ejected as liquid droplets under the action of a piezoelectric force through the nozzles N and injected into the respective pixels 2, while a voltage of 70 volts was applied between the first electrode 6 and the second electrodes 7 (FIGS. 10B and 10C).

Then, in the state of applying a voltage of 700 volts between the first electrode 6 and the second electrodes 7, an additional amount of the dispersion liquid 4 was injected so as to fill up the respective pixels 2 (FIG. 10D).

Then, a sealing adhesive 19 was applied at peripheries of one substrate 1a or 1b, and the substrates 1a and 1b were applied to each other with the adhesive.

The thus-prepared display device P1 having a structure as shown in FIG. 1 was driven by application of a voltage of 40 volts between the electrodes 6 and 7, whereby a good display could be performed at a contrast of 5 and a response speed of 20 msec. As the electrophoretic particles 5 were negatively charged, the electrophoretic particles were collected at exposed parts of the first electrode 6 when the first electrode 6 was supplied with a positive voltage will the second electrodes 7 were supplied with a negative voltage as shown in FIG. 1. In this state, the indicated pixels 2 displayed a black state as the second electrodes 7 and the electrophoretic particles 5 were both black-colored. On the other hand, if the electrodes 6 and 7 were supplied with reverse-polarity voltages, the electrophoretic particles 5 were collected at positions above the second electrodes 7 to effect white display.

During the drive, no density fluctuation among the respective pixels 2 were observed, whereby a good display quality was attained.

EXAMPLE 7

A display device P1 having a partial structure as shown in FIG. 1 was prepared through a process as illustrated in FIGS. 11A–11E, i.e., in a similar manner as in Example 6 except for using a distribution liquid L which has a dispersion of the electrophoretic particles 5 in alcohol.

After the distribution of the distribution liquid L through nozzles into respective pixels 2 (FIG. 11B) in a similar manner as in Example 6, the alcohol in the distributed liquid L was sufficiently evaporated off (FIG. 11C), followed by injection of the electrophoretic dispersion liquid 4 under application of a voltage between the electrodes 6 and 7 (FIG. 11D). This state is substantially identical to the state shown in FIG. 10D of Example 6.

Thereafter, the application of an opposite substrate 1a onto the thus treated substrate 1b (FIG. 11E) was performed in the same manner as in Example 6.

The thus-prepared display device exhibited similar performances as the one prepared in Example 6.

EXAMPLE 8

A display device P2 having a partial structure as shown in FIG. 2 was prepared through a process as illustrated in FIGS. 12A to 12E.

More specifically, as shown in FIG. 2, a first electrode 16 was formed on an entire surface of one substrate 1a, and second electrodes 17 were formed in a dot pattern at respective pixels, while coating the first electrode 16 and the second electrodes 17 respectively with insulating layers 8.

The substrates 1a and 1b used comprised a polyether sulfone film provided with a gas barrier layer. The first electrode 16 comprised ITO, and the second electrodes 17 comprised Ti. The insulating layers 8 were formed of acrylic resin, and the partitioning walls 3 were formed of polyimide resin. The electrophoretic particles 5 were formed as 2 $\mu$m-dia. positively chargeable white particles prepared by coating titanium oxide particles with a polymer containing a charge control agent. The dispersion liquid 4 comprised aliphatic hydrocarbon oil colored in blue with a blue pigment.

The display device P2 was prepared in the following manner with reference to FIGS. 12A to 12E.

A first electrode 16 was formed on an entire surface of a substrate 1a, and an insulating layer 8 was formed thereon. Further, partitioning walls 3 were formed in pattern on the insulating layer 8.

Separately, a distribution liquid L formed as a mixture of the electrophoretic dispersion liquid 4 and the electrophoretic particles 5 was distributed through nozzles N in equal amounts into respective pixels 2 in the same manner as in Example 6, while a voltage of 70 volts was applied between the first electrode 6 and the second electrodes 7 in the same manner as in Example 6 (FIGS. 12B and 12C).

Then, in the state of applying a voltage of 70 volts between the first electrode 6 and the second electrodes 7, an additional amount of the dispersion liquid 4 was injected to the respective pixels 2 (FIG. 12D).

Figure 12E:
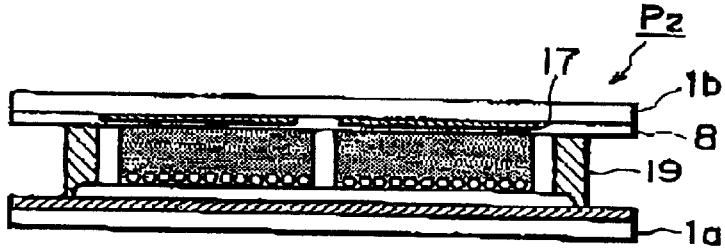

Then, second electrodes 17 were formed in a pattern on the other substrate 1b, and further coated with an insulating layer 8. Then, the substrates 1a and 1b were applied to each other with a sealing adhesive 19 applied at the periphery (FIG. 12E).

In the display device P2 thus produced, the first electrode 16 was grounded, and the second electrodes 17 were selectively supplied with a positive or a negative voltage. When the second electrodes 17 are supplied with a negative voltage, the positively charged electrophoretic particles 5 are collected to cover the second electrodes 17 as shown in FIG. 2, so that only the blue-colored dispersion liquid 4 is recognized when viewed in a direction A, thus providing blue display. On the other hand, when the second electrodes 17 are supplied with a positive voltage, the positively charged electrophoretic particles 5 are moved away from the second electrodes 17 to be collected on the first electrode 16. In this state, white display is performed by recognition of only the white electrophoretic particles 5 when the device P2 is viewed in arrow A direction.

As a result of actual drive of the display device P2 by application of voltage of 70 volts, a good display was performed at a contrast of 4 and a response speed of 200 msec. Good display quality was exhibited without density fluctuation among the respective pixels.

As described above, according to this embodiment, the distribution of electrophoretic particles to respective pixels is performed by distributing a distribution liquid containing the electrophoretic particles dispersed therein in substantially equal amounts to the respective pixels, whereby distribution in substantially in equal amounts of the electrophoretic particles to the respective pixels is ensured. As a result, the densities of the colored displayed by the particles are also uniformized at the respective pixels, thus providing the resultant display device with improved display quality.

What is claimed is:

1. A process for producing a display device of the type comprising: a pair of substrates disposed opposite to each other with a prescribed gap therebetween, partitioning walls disposed to divide the gap so as to define a plurality of pixels arranged along an extension of the substrates, an electrophoretic mixture comprising a dispersion liquid and a multitude of charged electrophoretic particles distributed to each pixel, and a first electrode and a second electrode disposed at each pixel so as to face the electrophoretic mixture; said process comprising:

forming the partitioning walls on one of the pair of substrates before the substrates are disposed with the prescribed gap therebetween to thereby define the plurality of pixels, and distributing a distribution liquid containing the electrophoretic particles dispersed therein to the respective pixels in substantially equal amounts through a nozzle while applying a voltage to at least one of the first and second electrodes.

2. A process according to claim 1, wherein the distribution liquid comprises a mixture of the dispersion liquid and the electrophoretic particles.

3. A process according to claim 2, wherein an additional amount of the dispersion liquid is distributed to fill the respective pixels before the pair of substrates are disposed with the prescribed gap therebetween.

4. A process according to claim 3, wherein the additional amount of the dispersion liquid is distributed to the respective pixels while applying a voltage to at least one of the first and second electrodes so as to electrostatically attract the electrophoretic particles distributed thereto.

5. A process according to claim 1, wherein the distribution liquid comprises a mixture of a volatile liquid and the electrophoretic particles dispersed therein.

6. A process for producing a display device of the type comprising: a pair of substrates disposed opposite to each other with a prescribed gap therebetween, partitioning walls disposed to divide the gap so as to define a plurality of pixels arranged along an extension of the substrates, an electrophoretic mixture comprising a dispersion liquid and a multitude of charged electrophoretic particles distributed to each pixel, and a first electrode and a second electrode disposed at each pixel so as to face the electrophoretic mixture; said process comprising:

forming the partitioning walls on one of the pair of substrates before the substrates are disposed with the prescribed gap therebetween to thereby define the plurality of pixels, distributing a mixture of a volatile liquid and the electrophoretic particles to the respective pixels in substantially equal amounts through a nozzle, evaporating the volatile liquid off the respective pixels, and distributing a dispersion liquid to fill the respective pixels.

7. A process according to claim 6, wherein the dispersion liquid is distributed to the respective pixels while applying a voltage to at least one of the first and second electrodes so as to electrostatically attract the electrophoretic particles distributed thereto.

* * * * *

UNITED STATES PATENT AND TRADEMARK OFFICE
CERTIFICATE OF CORRECTION

PATENT NO.    : 6,524,153 B1
DATED         : February 25, 2003
INVENTOR(S)   : Tsutomu Ikeda et al.

It is certified that error appears in the above-identified patent and that said Letters Patent is hereby corrected as shown below:

Column 3,
Line 64, "show" should read -- shown --.

Signed and Sealed this

Thirtieth Day of September, 2003

JAMES E. ROGAN
*Director of the United States Patent and Trademark Office*